Feb. 3, 1959     R. A. GOHLKE     2,872,222
MOWER REEL SHARPENING AND ACTUATING MEANS
Filed March 9, 1953
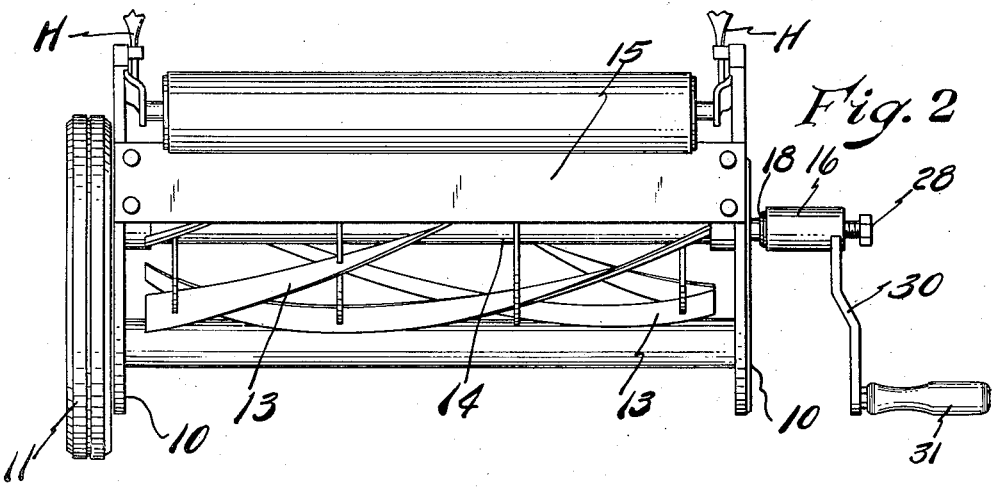
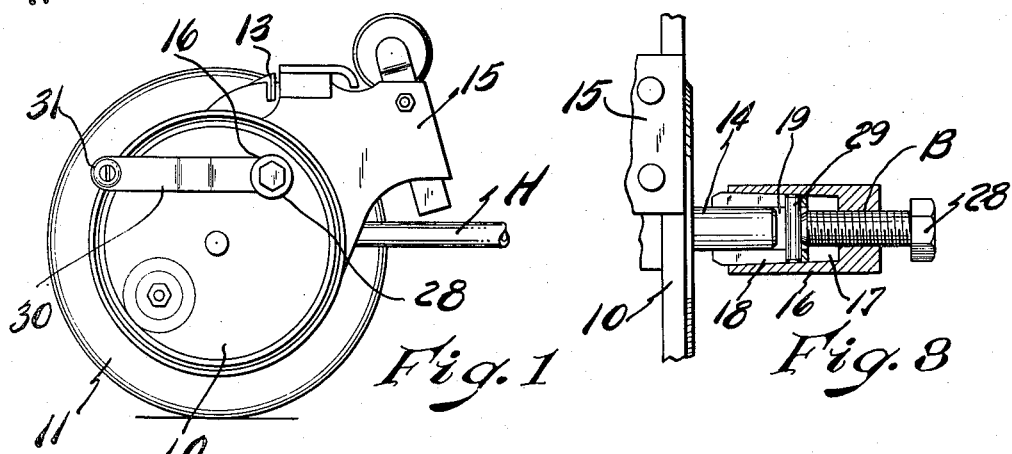
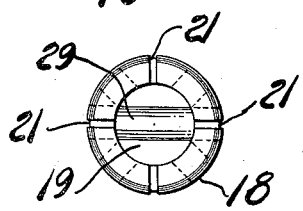 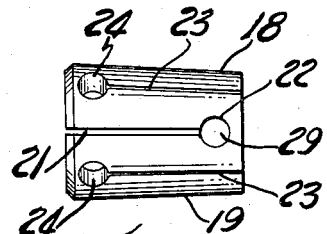 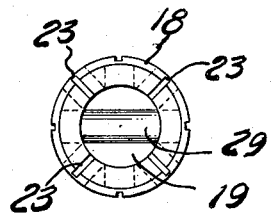
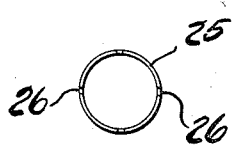 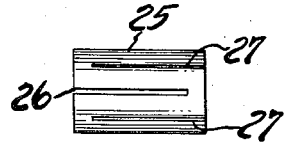
INVENTOR.
Rudolph A. Gohlke
BY
*Harman & Harman*
ATTORNEYS

United States Patent Office 2,872,222
Patented Feb. 3, 1959

2,872,222

MOWER REEL SHARPENING AND ACTUATING MEANS

Rudolph A. Gohlke, Alpena, Mich.

Application March 9, 1953, Serial No. 341,080

3 Claims. (Cl. 287—53)

This invention relates to means for rotating the cutting reels of lawn mowers, and more particularly to a mechanism which contemplates retaining the reel and its cutting blades in operative and rotative position within the lawn mower during the sharpening and abrading operation of the cutting edges of the blades and the abrading of said edges and the shear blade concurrently with the rotation of the reel.

Another object of the invention is to design a simple, practical, and inexpensive means applicable to the shaft of the mower reel, and by means of which said reel may be rotated for sharpening the blades thereof when necessary and desirable.

A further object is to provide simple, easily applicable means for rotation of the mower reel, which requires no holddown frame bracket or other supports for the mower, which is applicable to any type of mower, either powered or manually propelled, and which can be sharpened on the workbench, or in fact on the lawn by merely resting the mower on a box or other support.

A further object is to provide a manually actuated reel rotating means which retains the cutting reel and shear bar in operative, assembled position, so that the shear blade is sharpened simultaneously with the cutter blades.

A still further object of the invention is to design a reel rotating device for securely gripping the reel shaft which incorporates means for readily disengaging the device after the blades of the mower have been sharpened.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion, and minor details of construction, without departing from the spirit, or sacrificing any of the advantages of the invention.

In the drawing:

Fig. 1 is an end elevational view of an inverted lawn mower with the power wheel removed and my actuating means in position on the reel shaft.

Fig. 2 is a top plan view thereof.

Fig. 3 is a detail, side elevational view of the gripper member or collapsible collet.

Fig. 4 is an end elevational view of the collet.

Fig. 5 is an end elevational view of the opposite end of the member.

Fig. 6 is a side elevational view of a bushing adaptor for the collet.

Fig. 7 is an end elevational view thereof.

Fig. 8 is a fragmentary, sectional view illustrating the means for removing the collet from the sleeve.

Referring now to the accompanying drawing in which I have shown the preferred embodiment of my invention and more particularly to Fig. 1 in which a lawn mower is shown in inverted position, the numeral 10 indicating the frame of the lawn mower which is normally supported by the wheels 11 mounted on axles 12 as usual.

A reel with cutting blades 13 is mounted on a shaft 14 which may be driven by the rotation of the wheels 11 and axles 12 through pinion gears (not shown), or by a suitable motor (not shown) mounted on the frame and the blades 13 are associated with a shear blade 15 in the conventional manner. In Figs. 1 and 2, the handle H is broken away, and the mower is shown with the one wheel thereof removed.

An excellent manner in which to sharpen the blades 13 is to place a sharpening compound (not shown) on the cutting edges of the blades 13, and on the shear blade 15, so that they can be sharpened by simply rotating the shaft 14. In this operation, the wheel 11, and the drive and pinion gears (not shown) are first removed to expose the end of the shaft 14, after which my shaft gripping and reel rotating means is applied.

Broadly, the device comprises a handle socket 16 formed with an outwardly tapered bore 17 which is adapted to receive a longitudinally tapered gripping member or collet 18 formed as clearly shown in Figs. 3, 4 and 5 of the drawings, said collet being bored with a taper as at 19 to fit over the end of the shaft 14.

The member 18 is collapsible for gripping engagement with the shaft 14 and is formed with longitudinally disposed slits 21 open to one end of said gripping member, said slits terminating in enlarged openings 22 directly adjacent the opposite end thereof, and similar slits 23 open to the opposite end of the gripping member 18 and terminate in similar openings 24 directly adjacent the opposite end thereof, all for a purpose to be presently described.

Since the diameter of the shaft 14 will vary somewhat with different models and manufacturers of lawn mowers, tapered bushing adaptors 25, of various wall thickness, are provided for insertion in the collets 18 when necessary. These adaptors are similarly formed with slits 26 leading from the one end of the adaptor, and slits 27 leading from the opposite end of the adaptor, so that these adaptors 25 are collapsible within the collapsible collets 18.

Provided in the end wall of the handle socket 16 is a threaded bore B and a bolt 28 is mounted therein, the end of the bolt 28 engaging a transversely disposed pin 29 disposed in the openings 22 to force the member 18 out of the tapered bore 17 after the blades have been sharpened, and it is desired to remove the collet. A crank 30 extends laterally from the socket 16 and a handle 31 is provided thereon so that the device and shaft 14 can be very easily manually actuated.

In practice, after removing the one wheel 11 and gears (not shown) associated therewith and placing the sharpening compound on the blades 13 and 15, the collet 18 is placed over the exposed end of the shaft 14. The socket 16 is then slipped over the collet 18, collapsing it and causing it to tightly grip the shaft 14, so that the shaft and mower reel will be rotated as the handle is actuated. If necessary, the socket 16 can be tapped into engagement by lightly striking the arm 30 with a hammer or other tool. In some cases with a shaft 14 of reduced diameter, it will be desirable to first slip an adaptor 25 on the shaft 14, then press the collet 18 thereover, and these adaptors are of varying diameter to suit mowers of different makes and sizes.

To remove the device once the sharpening operation has been completed, the bolt 28 is rotated to engage the pin 29 and force the socket 16 from driving engagement with the collet 18.

From the foregoing description, it will be obvious that I have perfected a very simple, practical and inexpensive mechanism for rotating the reel of a lawn mower when sharpening the blades thereof.

What I claim is:

1. A mower reel rotating mechanism for releasable connection to the drive end of the reel shaft comprising, a collapsible gripper member mounted on said shaft, a socket with an outer end wall, said socket being formed with a longitudinally tapered bore pressed over said member for collapsing said member to cause it to grip said shaft, a handle on said socket to facilitate manual rotation of the device, and adjustable means threaded in the end wall of said socket and engageable with said member to force said socket out of engagement with said member upon actuation thereof.

2. A mower reel rotating mechanism for releasable connection to the end of the mower reel shaft comprising, a hollow, tapered, collapsible collet member formed with a plurality of slits opening from one end of said member, and a plurality of slits opening from the opposite end of said member, said slits terminating in enlarged openings at points directly adjacent the ends of the member, a transversely disposed pin spanning said member directly adjacent one end thereof, a socket with an outer end wall, said socket having a longitudinally tapered bore pressed over said member for collapsing it to cause said member to grip said shaft, a crank handle on said socket for rotating said mechanism and shaft, and a longitudinally disposed member threaded in the end wall of said socket and engageable with said pin upon adjustment thereof to remove said collet member from driving engagement with said socket.

3. The combination defined in claim 2 in which collapsible adaptor bushings are provided for insertion in said collet member to facilitate the gripping of shafts of reduced diameter.

References Cited in the file of this patent

UNITED STATES PATENTS

| | | |
|---|---|---|
| 1,166,408 | Blood | Dec. 28, 1915 |
| 1,427,798 | Feeney | Sept. 5, 1922 |
| 1,582,445 | Border | Apr. 27, 1926 |
| 1,592,942 | Hanson | July 20, 1926 |
| 1,702,511 | Karlovick | Feb. 19, 1929 |
| 1,797,296 | Ray | Mar. 24, 1931 |
| 1,989,083 | Dahnken et al. | Jan. 29, 1935 |
| 2,190,005 | Basham | Feb. 13, 1940 |
| 2,515,183 | Benjamin et al. | July 18, 1950 |

FOREIGN PATENTS

| | | |
|---|---|---|
| 800,181 | Germany | Oct. 12, 1950 |